(12) United States Patent
Ueno et al.

(10) Patent No.: US 9,045,610 B2
(45) Date of Patent: Jun. 2, 2015

(54) COMPOSITE STRUCTURAL ARTICLE

(75) Inventors: Nobukazu Ueno, Seki (JP); Ryou Ando, Kasugai (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 13/150,561

(22) Filed: Jun. 1, 2011

(65) Prior Publication Data
US 2011/0300365 A1 Dec. 8, 2011

(30) Foreign Application Priority Data
Jun. 8, 2010 (JP) ................. 2010-131535

(51) Int. Cl.
| | | |
|---|---|---|
| B32B 5/00 | (2006.01) |
| B32B 5/02 | (2006.01) |
| B32B 5/18 | (2006.01) |
| C08J 9/33 | (2006.01) |
| B29C 70/14 | (2006.01) |
| C08J 9/00 | (2006.01) |
| B29K 105/04 | (2006.01) |
| C08G 101/00 | (2006.01) |

(52) U.S. Cl.
CPC ............ C08J 9/33 (2013.01); *Y10T 428/268* (2013.01); B29C 70/14 (2013.01); *B29K 2105/04* (2013.01); *C08G 2101/0008* (2013.01); *C08G 2101/005* (2013.01); C08J 9/0085 (2013.01); *C08J 2375/04* (2013.01); *C08J 2205/06* (2013.01); *C08J 2467/02* (2013.01)

(58) Field of Classification Search
CPC .......... C08J 9/33; C08J 2205/06; B32B 5/00; B32B 5/02; B32B 5/18; B32B 3/00; A47G 27/0468
USPC ............. 428/220, 317.9, 338, 339, 95, 221, 428/304.4; 442/370; 52/309.1, 309.5
See application file for complete search history.

(56) References Cited

U.S. PATENT DOCUMENTS

2006/0106124 A1* 5/2006 Fink et al. .................... 521/172
2008/0075915 A1* 3/2008 Wening et al. ................. 428/95

FOREIGN PATENT DOCUMENTS

| JP | 2008-089620 | 4/2008 |
| JP | 2009-504940 | 2/2009 |
| JP | 2009-534241 | 9/2009 |
| WO | WO 93/07318 | * 4/1993 |
| WO | 2007/061300 | 5/2007 |
| WO | 2007/121964 | 11/2007 |

OTHER PUBLICATIONS

U.S. Appl. No. 13/087,661 to Yasuhiro Beppu et al., which was filed on Apr. 15, 2011.
China Office action, dated Mar. 20, 2013 along with an english translation thereof.

(Continued)

*Primary Examiner* — Maria Veronica Ewald
*Assistant Examiner* — Joanna Pleszczynska
(74) *Attorney, Agent, or Firm* — Greenblum & Bernstein, P.L.C.

(57) ABSTRACT

The present composite structural article is a material which is in a plate-like shape and has mutually adhered fibers, and a foam that is arranged in a gap among fibers and is adhered to the fibers. The fibers are oriented from one surface side toward the other surface side thereof, and the content of the foam is in the range from 7% to 68% by weight based on 100% by weight of the total of fibers, foam and adhesive agent. The foam has preferably a size so as to pass through a sieve having an opening of 19 mm according to JIS Z8801.

4 Claims, 4 Drawing Sheets

(56) References Cited

OTHER PUBLICATIONS

Japanese Office Action dated Jan. 28, 2014, along with an English-language translation thereof.

Chinese Office action, dated Nov. 27, 2013, along with an English-language translation thereof.

Japanese Office action dated Sep. 2, 2014, along with an English-language translation thereof.

\* cited by examiner

FIG. 7

COMPOSITE STRUCTURAL ARTICLE

INCORPORATION BY REFERENCE

The present application claims priority under 35 U.S.C. §119 of Japanese Patent Application No. 2010-131535, filed on Jun. 8, 2010, the disclosure of which is expressly incorporated by reference herein in its entirety.

BACKGROUND OF THE INVENTION

1. Field of the Invention

The present invention relates to a composite structural article in a plate-like containing a fiber and a foam. More specifically, the present invention relates to a composite structural article which is less in depressed amount upon application of a load to a surface thereof, and which is less in depressed amount after restoration of the formed depression upon releasement of the load application. The composite structural article of the present invention is suitable for a member disposed in a floor, a member disposed in a wall, or the like.

2. Related Art

A molded article including fibers is conventionally used as an impact absorbing material, sound absorbing material, heat insulator, and the like, to be disposed in a floor of an automobile, and in a ceiling, a wall, a floor, and the like of a building such as a house.

Disclosed in Japanese Unexamined Patent Application Publication No. 2008-89620 is a sound absorbing material including a plate-like fibrous structural article produced by pressing a fiber-made substrate in its thickness direction, where the fiber-made substrate includes nonelastic crimped monofilaments and thermally adhesive composite monofilaments that are mutually mixed at a predetermined weight ratio and then are adhered to one another by heating in a state that the respective monofilaments are crossed with one another, and where the nonelastic crimped monofilaments and thermally adhesive composite monofilaments are arranged in the thickness direction of the fiber-made substrate.

SUMMARY OF THE INVENTION

The fiber-made structural article disclosed in Japanese Unexamined Patent Application Publication No. 2008-89620 is considerably large in depressed amount upon application of a load to a surface of the fiber-made structural article. Therefore, even if the load application is released, the once formed depressed portion is not sufficiently restored and the surface thereof cannot be kept flat.

It is therefore an object of the present invention to provide a composite structural article in a plate-like shape, which is less in depressed amount upon application of a load to a surface thereof, and which is less in depressed amount after restoration of the formed depression upon releasement of the load application.

The present inventors have obtained such a knowledge that the above problem is achieved by integrating many fibers with small pieces of a resin foam which is presently used for a seat cushion of an automobile and the like, into a composite structural article in a plate-like shape where the fibers are oriented parallelly to a direction of the thickness of the composite structural article, i.e., to a direction from one surface side toward the other surface side thereof.

The present invention is as follows.
1. A composite structural article in a plate-like shape, comprising mutually adhered fibers, and a foam which is arranged in a gap among fibers and is adhered to the fibers,
wherein the fibers are oriented from one surface side toward the other surface side of the composite structural article, and
wherein the content of the foam is in the range from 7% to 68% by weight based on 100% by weight of the total of the fibers, the foam and adhesive agent.
2. The composite structural article according to 1 above, wherein the foam has a size passing through a sieve having an opening of 19 mm according to JIS Z8801.
3. The composite structural article according to 1 above, wherein the thickness of the composite structural article is in the range from 2 to 100 mm.
4. The composite structural article according to 1 above, wherein, when a load of 220 kPa is applied to the surface of the composite structural article according to JIS L1021, the depression ratio $[(t2/t1) \times 100]$ of the composite structural article just after releasement of the load application, and the depression ratio $[(t3/t1) \times 100]$ of the composite structural article after a lapse of 1 hour from the releasement of the load application, satisfy the following equations (1) and (2), $$(t2/t1) \times 100 > 50.00 \qquad (1)$$

$$(t3/t1) \times 100 > 87.00 \qquad (2)$$

wherein t1 is a thickness of the composite structural article before the load application; t2 is a thickness of the composite structural article just after releasement of the load application; and t3 is a thickness of the composite structural article after a lapse of 1 hour from the releasement of the load application.

Since the composite structural article of the present invention is an elastic body containing many fibers and foams, when a load is applied to a surface thereof, a depressed amount is less, and when the load is released, a depressed amount after restoration of the formed depression is less. That is to say, the composite structural article is excellent in durability (external appearance characteristic, shape stability, and the like).

In the case where the foam has a size passing through a sieve having an opening of 19 mm according to JIS Z8801, the aforementioned effect is pronounced.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 5 is a schematic view of a cross-sectional structure of a composite structural article obtained in Comparative Example 5 and the like;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
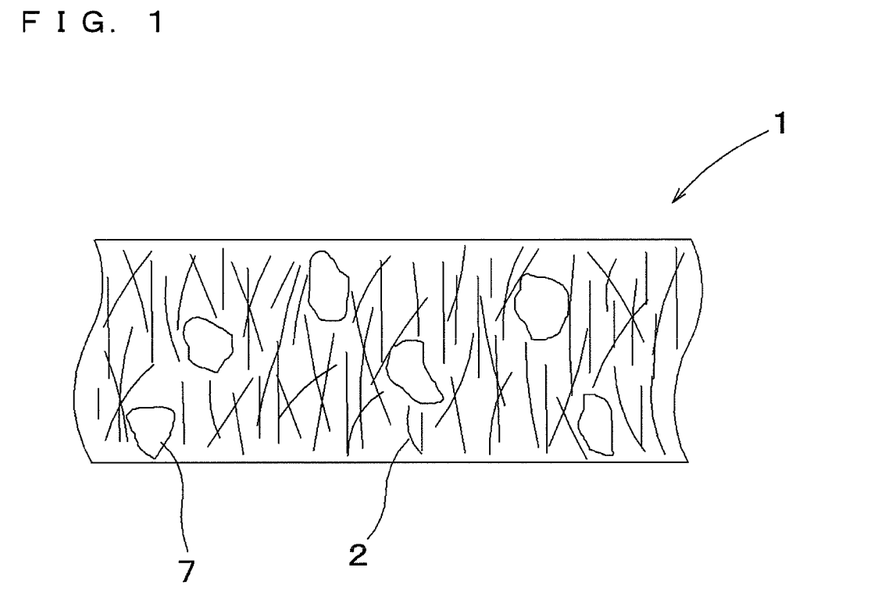
FIG. 1 is a schematic view of a cross-sectional structure of the composite structural article of the present invention.

The composite structural article of the present invention is a structural article which is in a plate-like shape and contains fibers in adhesion state, and a foam that is arranged in a gap among fibers and is adhered to the fibers. The schematic cross-section is shown in FIG. 1. The composite structural article 1 shown in FIG. 1 contains mutually adhered fibers 2, and a foam 7 which is arranged in a gap among fibers and is adhered to the fibers. And the fibers 2 are oriented from one surface side toward the other surface side of the composite structural article 1. That is, the fibers 2 in the composite structural article 1 of the present invention are oriented in a vertical direction or oblique direction from an upper surface side toward a lower surface side of the composite structural article 1 in FIG. 1. The composite structural article of the present invention may further include fibers oriented in a lateral direction.

The thickness of the composite structural article of the present invention is appropriately selected depending on the purpose, usage, and the like, and is preferably in the range from 2 to 100 mm, more preferably from 5 to 80 mm, and further preferably from 30 to 80 mm.

Examples of the fiber constituting the composite structural article of the present invention include a natural fiber made of cotton, wool, or the like; a synthetic fiber such as a carbon fiber, and a fiber containing a thermoplastic resin; and the like. Among them, the synthetic fiber is preferable, from standpoints of a handling ability and a recycling characteristic. Preferable as the resin contained in the synthetic fiber is a polyester such as polyethylene terephthalate, polytrimethylene terephthalate, polybutylene terephthalate, polyhexamethylene terephthalate, polytetramethylene terephthalate, poly 1,4-dimethylcyclohexane terephthalate, and polynaphthalene terephthalate; polypivalolactone, polylactic acid (PLA), stereocomplex polylactic acid, polyolefin, polyamide, polyacrylate, and the like. Particularly preferred is a fiber containing a polyester from a standpoint of thermal characteristic. Preferable as the polyester is a polyethylene terephthalate, from standpoints of a recycling characteristic, a fiber formability, and the like.

The fibers may contain a coloring agent, an antioxidant, a ultraviolet absorber, an anti-aging agent, a flame retardant, an antibacterial agent, a matting agent, and the like.

The shape and size of the fiber are not particularly limited.

The fiber may be in a straight, curved, helical, crimped, or the like, and the fiber may be curled at tip end thereof.

The length (hereinafter, referred to as "fiber length") and outer diameter (hereinafter, referred to as "fiber diameter") of the fiber are appropriately selected depending on the thickness and the like of the composite structural article.

The average fiber length is preferably 5 mm or longer, more preferably in the range from 5 to 25 mm, and further preferably from 5 to 15 mm, from a standpoint of rigidity of the composite structural article.

Additionally, the average fiber diameter is preferably in the range from 2 to 19 dtex, more preferably from 2 to 12 dtex, and further preferably from 2 to 7 dtex, from a standpoint of rigidity of the composite structural article.

The aforementioned average fiber length and average fiber diameter are measurable by an electron microscope or the like.

The foam constituting the composite structural article of the present invention is usually a resin foam, and may be consisting of a synthetic resin such as a polyurethane, polyisocyanate, polyisocyanurate, polyolefin, polystyrene, poly vinyl chloride, and phenol resin; or the like.

In the present invention, a soft resin foam is preferable from a standpoint of a pressure dispersion ability, and a soft polyurethane foam is particularly preferable since a depressed amount when a load is applied to a surface of the composite structural article, can be less, and a depressed amount after restoration of the formed depression when the load is released, can be less.

The shape and size of the foam are to be appropriately selected depending on the thickness and the like of the composite structural article and are not particularly limited. The foams, when they are contained in the composite structural article, may be compressed or uncompressed.

The shape of the foam may be in a polyhedral, spherical, hemispherical, oval spherical, star, or indefinite.

The size of the foam is preferably one passing through a sieve having an opening of 19 mm according to JIS Z8801, and more preferably a size passing through a sieve having an opening of 19 mm and not passing through a sieve having an opening of 4.75 mm, and further preferably a size passing through a sieve having an opening of 16 mm and not passing through a sieve having an opening of 4.75 mm. Although the composite structural article may contain a small foam having a size passing through the sieve having an opening of 4.75 mm, the content of the small foam is preferably 10% or less by weight, and more preferably in the range from 1% to 7% by weight based on the total amount of the foams.

The maximum length of the foam is preferably one equivalent of 15% to 65% of the thickness of the composite structural article.

The content of the foam in the composite structural article of the present invention is in the range from 7% to 68% by weight, preferably from 15% to 65% by weight, and more preferably from 20% to 60% by weight, based on 100% by weight of the total of a fiber, foam, and adhesive agent, from a standpoint of rigidity of the composite structural article.

The fibers in the composite structural article of the present invention are joined to one another via an adhering layer made of an adhesive agent, while the fibers are entwined with one another or are contacted to one another at points or along lines. Further, the fiber and foam are also joined to one another via an adhering layer made of an adhesive agent. Examples of a constituent material of the adhering layer include a polyester-based resin, a urethane-based resin, a vinyl acetate-based resin, an acryl-based resin, and the like.

The composite structural article of the present invention is in a plate-like shape. It is not particularly limited in terms of an air permeability therethrough from one surface side to the other surface side. The preferable composite structural article is in a configuration that the fibers and foams are integrated with one another at a higher density while improving a filling ratio.

Figure 2:
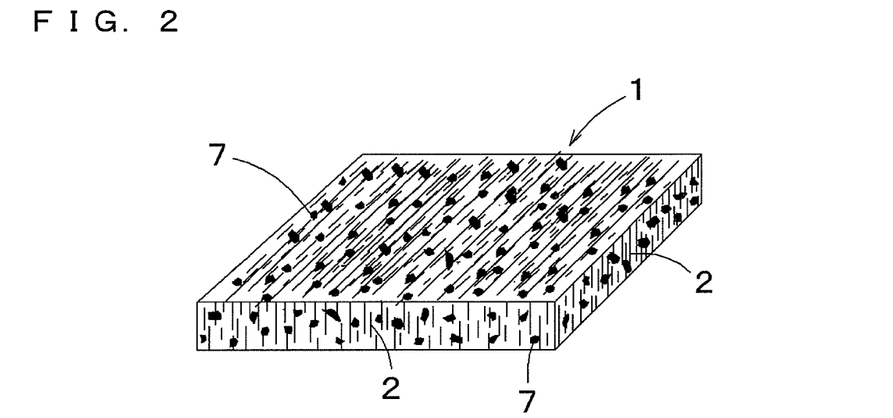
FIG. 2 is a schematic perspective view of the composite structural article of the present invention, showing that fibers are aligned.

In the composite structural article of the present invention, as described above, fibers are oriented from one surface side toward the other surface side, the composite structural article may have a structure shown in FIG. 2 where the fibers 2 are orderly arranged.

Figure 3:
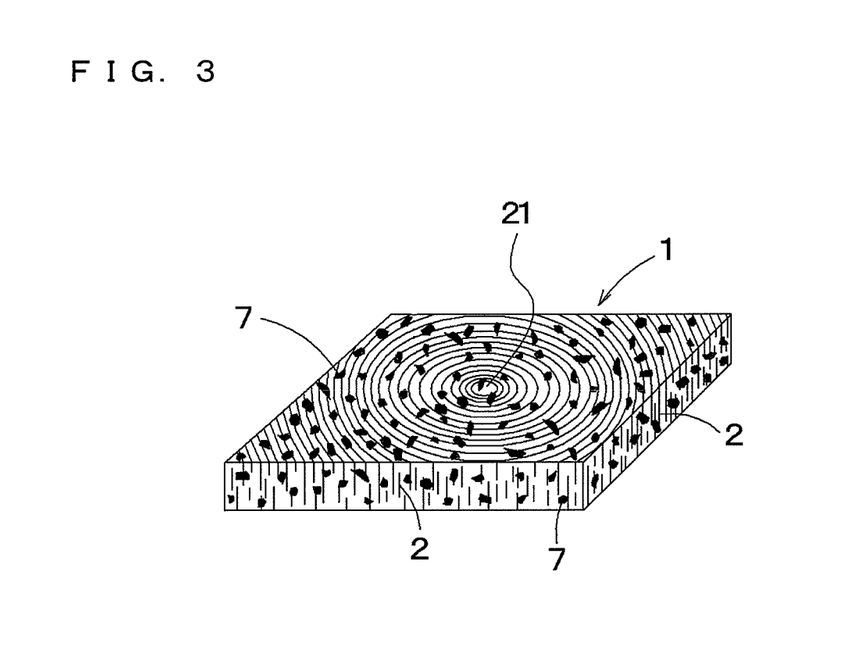
FIG. 3 is a schematic perspective view of the composite structural article of the present invention, showing that fibers are arranged in an annual ring configuration.

The composite structural article of the present invention may have a structure shown in FIG. 3 where the fibers 2 are arranged in an annual ring centering on a virtual axis 21 while the fibers are adhered to one another. Such an annual ring pattern can be confirmed by visually observing the surface of the composite structural article.

The structure of the annual ring is in such a configuration that sheets formed of mutually adhered fibers are wound over and over again around the virtual axis 21 in a manner of concentric circles, and the fibers are adhered to one another among the neighboring sheets as well. Further, the foams are contained in the respective sheets, or inbetween the neighboring sheets, respectively. It is noted that the "structure of fibers arranged in an annual ring configuration" in the composite structural article of the present invention does not necessarily reflect shapes of circular and substantially circular annual rings, and may include arcuate shape such as semicircular ones.

The number of annual ring patterns (virtual axes) may be only one, or two or more, at the one surface side of the composite structural article.

The composite structural article having the above structure is a preferable configuration, in that the composite structural article is rarely subjected to occurrence of deformation and breakage even when a tensile force is applied to the composite structural article in a plane direction thereof.

The composite structural article of the present invention is one which is less in depressed amount upon application of a load to a surface thereof, and which is less in depressed amount after restoration of the formed depression upon releasement of the load application. When a load of 220 kPa is applied to the surface of the composite structural article according to JIS L1021, the depression ratio [(t2/t1)×100] (unit: %) of the composite structural article just after releasement of the load application, and the depression ratio [(t3/t1)×100] (unit: %) of the composite structural article after a lapse of 1 hour from the releasement of the load application, satisfy the following equations (1) and (2).

$$(t2/t1) \times 100 > 50.00 \quad (1)$$

$$(t3/t1) \times 100 > 87.00 \quad (2)$$

In the formulae, t1 is a thickness of the composite structural article before the load application; t2 is a thickness of the composite structural article just after releasement of the load application; and t3 is a thickness of the composite structural article after a lapse of 1 hour from the releasement of the load application.

In the formula (1), $(t2/t1) \times 100 > 55$ is preferable. In the formula (2), $(t3/t1) \times 100 > 90$ is preferable.

The production method of the composite structural article of the present invention is not particularly limited. Example thereof includes a method in which starting fibers containing a thermally fusion-bondable fiber and resin foams are filled into, for example, a vessel having through-holes or a vessel having no through-holes, such that the starting fibers are oriented in a specific direction; and the filled matters are heated to melt at least part of the thermally fusion-bondable fiber and cause the melted components to act as an adhesive agent, thereby adhering the fibers to one another and the resin foams and fibers to one another, into an integrated product.

In this method, the starting fibers preferably contain the thermally fusion-bondable fiber in an amount of at least 1% by weight. Thus, it is possible to adopt, as the starting fibers, the thermally fusion-bondable fiber only, or a combination of the thermally fusion-bondable fiber and a fiber (hereinafter, called "ordinary fiber"), which does not have a thermal fusion bondability. In the latter case, the weight ratio of the thermally fusion-bondable fiber and the ordinary fiber to be used are preferably 35% to 99% by weight and 1% to 65% by weight, more preferably 40% to 98% by weight and 2% to 60% by weight, and further preferably 45% to 95% by weight and 5% to 55% by weight, respectively, assuming that the total amount of both is 100% by weight, from standpoints of adhesiveness among fibers, and rigidity of the composite structural article. Excessively smaller amount of the thermally fusion-bondable fiber occasionally fails to retain a shape of resultant composite structural article and to obtain rigidity thereof.

The thermally fusion-bondable fiber is not particularly limited, insofar as a part of the fiber is melted by heating, and the thus melted component is capable of adhering the ordinary fibers to one another. Examples of the thermally fusion-bondable fiber include: a full-melt type fiber; a composite fiber (hereinafter, referred to as "thermally fusion-bondable composite fiber") consisting of a high melting-point resin and a low melting-point component such that the low melting-point component is exposed at least part of a surface of the fiber; and the like. These thermally fusion-bondable fibers may be used singly or in combination of two or more types thereof.

The shape and size of the thermally fusion-bondable fiber are not particularly limited.

The shape of the thermally fusion-bondable fiber may be straight, curved, helical, or crimped shape.

The fiber length and fiber diameter of the thermally fusion-bondable fiber may be selected according to the thickness of the composite structural article to be produced, and the like.

The average fiber length is preferably 5 mm or longer, more preferably in the range from 5 to 25 mm, and further preferably from 5 to 15 mm, from standpoints of rigidity of the composite structural article, and readiness of the production thereof.

Additionally, the average fiber fineness is preferably in the range from 2 to 19 dtex, more preferably from 2 to 12 dtex, and further preferably from 2 to 7 dtex, from standpoints of rigidity of the composite structural article.

In the above method, it is preferable to adopt a thermally fusion-bondable composite fiber, as the thermally fusion-bondable fiber. In this case, when the thermally fusion-bondable composite fiber is heated at a temperature lower than a melting point of the high melting-point resin, the deterioration of its mechanical strength can be restricted while keeping the structure of the high melting-point resin, thereby allowing the rigidity of the composite structural article to be kept high.

Examples of the thermally fusion-bondable composite fiber include a sheath-core type, a side-by-side type, an orange type of fiber having a cross section divided into two or more kinds of components, a sea-island type, and the like. The difference between a melting point of the low melting-point component and a melting point of the high melting-point resin of the thermally fusion-bondable composite fiber is preferably 50° C. or higher, and more preferably 100° C. or higher.

The high melting-point resin of the thermally fusion-bondable composite fiber may be the same as or different from the constituent material of the ordinary fiber.

Examples of the high melting-point resin may include polyethylene terephthalate, polybutylene terephthalate, polyhexamethylene terephthalate, polytetramethylene terephthalate, poly 1,4-dimethylcyclohexane terephthalate, and polypivalolactone as well as a copolymerized polyester. The melting point of the high melting-point resin is preferably in the range from 200° C. to 300° C., and more preferably from 230° C. to 260° C.

In addition, examples of the low melting-point component include a polyester, a polyurethane, a polyolefin, a poly vinyl alcohol, and the like.

The polyester for the low melting-point component is a polyester which is obtained using a dicarboxylic acid and a diol, and has a melting point of preferably between 80° C. and 140° C., and more preferably between 100° C. and 120° C.

In the present invention, the low melting-point component is preferably a copolymerized polyester from a standpoint of adhesiveness of fibers.

The copolymerized polyester is preferably a polyester obtained using a dicarboxylic acid, diol, and hydroxycarboxylic acid.

Examples of the dicarboxylic acid include an aromatic dicarboxylic acid such as terephthalic acid, isophthalic acid, phthalic acid, naphthalene dicarboxylic acid, 4,4'-dicarboxybiphenyl, and 5-sodiumsulfo isophthalic acid; a saturated aliphatic dicarboxylic acid such as oxalic acid, malonic acid, succinic acid, adipic acid, azelaic acid, sebacic acid, undecanoic diacid, dodecanoic diacid, octadecanoic diacid, and eicosanoic diacid; an unsaturated aliphatic dicarboxylic acid such as fumalic acid, maleic acid, itaconic acid, mesaconic acid, and citraconic acid; an alicyclic dicarboxylic acid such as 1,4-cyclohexane dicarboxylic acid, 1,3-cyclohexane dicarboxylic acid, 1,2-cyclohexane dicarboxylic acid, 2,5-norbornene dicarboxylic acid, and tetrahydrophthalic acid; and the like. It is noted that these dicarboxylic acids may be anhydrides.

Examples of the diol include an aliphatic glycol such as ethylene glycol, 1,2-propane diol, 1,3-propane diol, 1,2-butane diol, 1,3-butane diol, 1,4-butane diol, 2-methyl-1,3-propane diol, 2,2-diethyl-1,3-propane diol, 2-amino-2-ethyl-1,3-propane diol, 2-amino-2-methyl-1,3-propane diol, 2-ethyl-2-methyl-1,3-propane diol, 2-butyl-2-ethyl-1,3-propane diol, neopentyl glycol, 3-methyl-1,5-pentane diol, 1,5-pentane diol, 1,6-hexane diol, 1,7-heptane diol, 1,8-octane diol, 1,9-nonane diol, 1,10-decane diol, diethylene glycol, triethylene glycol, dipropylene glycol, and tripropylene glycol; an alicyclic glycol such as bisphenol A, bisphenol S, ethylene oxide adduct or propylene oxide adduct of 4,4'-biphenol, and cyclohexanedimethanol; a polyalkylene glycol such as polyethylene glycol, polypropylene glycol, and polytetramethylene glycol; and the like.

Examples of the hydroxycarboxylic acid include p-hydroxybenzoic acid, m-hydroxybenzoic acid, o-hydroxybenzoic acid, lactic acid, oxirane, β-propiolactone, β-butyrolactone, γ-butyrolactone, δ-valerolactone, ε-caprolactone, glycolic acid, 2-hydroxybutyric acid, 3-hydroxybutyric acid, 4-hydroxybutyric acid, 2-hydroxyisobutyric acid, 2-hydroxy-2-methylbutyric acid, 2-hydroxyvaleric acid, 3-hydroxyvaleric acid, 4-hydroxyvaleric acid, 5-hydroxyvaleric acid, 6-hydroxycaproic acid, 10-hydroxystearic acid, and the like.

In addition to the dicarboxylic acid, diol, and hydroxycarboxylic acid, it is possible to use a tri- or more functional carboxylic acid, and a tri- or more hydric alcohol, as required.

Examples of the tri- or more functional carboxylic acid include an aromatic carboxylic acid such as trimellitic acid, pyromellitic acid, benzophenone tetracarboxylic acid, trimellitic anhydride, pyromellitic anhydride, benzophenone tetracarboxylic anhydride, and trimesic acid, and an aliphatic carboxylic acid such as 1,2,3,4-butanetetracarboxylic acid.

Examples of the tri- or more hydric alcohol include glycerol, trimethylolpropane, trimethylolethane, pentaerythritol, α-methylglucose, mannitol, sorbitol, and the like.

Examples of the polyurethane include a polymer obtained by reacting a polyol having a molecular weight of about 500 to 6,000, an organic diisocyanate having a molecular weight of 500 or less, and a chain elongating agent having a molecular weight of 500 or less; and the like.

Examples of the polyol include a dihydroxy polyether, a dihydroxy polyester, a dihydroxy polycarbonate, a dihydroxy polyesteramide, and the like.

Examples of the organic diisocyanate include p,p'-diphenyl methane diisocyanate, tolylene diisocyanate, isophorone diisocyanate, hydrogenated diphenylmethane diisocyanate, xylylene diisocyanate, 2,6-diisocyanate methyl caproate, hexamethylene diisocyanate, and the like.

Further, examples of the chain elongating agent include a glycol, an amino alcohol, a triol, and the like.

The ratios of the high melting-point resin and low melting-point component in the thermally fusion-bondable composite fiber are preferably 25% to 75% by weight and 25% to 75% by weight, more preferably 30% to 70% by weight and 30% to 70% by weight, and further preferably 35% to 65% by weight and 35% to 65% by weight, respectively, based on 100% by weight of the total amount of both.

The above-described fiber is usable as the ordinary fiber which is used combinedly with the thermally fusion-bondable fiber, and which constitutes the composite structural article of the present invention. It is possible to adopt therefor a recycled fiber which is called a mixed cotton or a shoddy, in addition to commercially available synthetic fibers.

The fiber length and fiber diameter of the ordinary fiber may be selected according to the thickness of the composite structural article to be produced, and the like.

The average fiber length is preferably 5 mm or longer, more preferably in the range from 5 to 25 mm, and further preferably from 5 to 15 mm, from standpoints of rigidity of composite structural article, and readiness of the production thereof.

Additionally, the average fiber fineness is preferably in the range from 2 to 19 dtex, more preferably from 2 to 12 dtex, and further preferably from 2 to 7 dtex, from standpoints of rigidity of composite structural article.

When the thermally fusion-bondable fiber is a thermally fusion-bondable composite fiber, it is preferable to adopt, as the ordinary fiber, a fiber made of a material having a melting point higher than the highest temperature among the melting points of the low melting-point components in the thermally fusion-bondable fiber. The constituent material of the ordinary fiber is preferably the same type, and particularly the same resin, as the high melting-point resin in the thermally fusion-bondable composite fiber. This configuration allows for obtainment of a composite structural article having a stable rigidity. Particularly, when the ordinary fiber is made of a polyester, and the thermally fusion-bondable composite fiber contains a polyester as the high melting-point resin and a copolymerized polyester as the low melting-point component, it is possible to obtain a composite structural article in which the fibers consisting of the polyester are sufficiently adhered to one another through the copolymerized polyester, thereby leading to a composite structural article which is less in depressed amount upon application of a load to a surface thereof.

The ratio of amounts of the ordinary fibers and the thermally fusion-bondable composite fibers to be used is typically selected depending on the ratio of the high melting-point resin and low melting-point component in the thermally fusion-bondable composite fiber. The ratio thereof is preferably from 40% to 97% by weight and 3% to 60% by weight, more preferably from 45% to 92% by weight and 8% to 55% by weight, and further preferably from 52% to 88% by weight and 12% to 48% by weight, respectively, based on 100% by weight of the total amount of both fibers.

The resin foam to be used is the same as above-described resin foam which is usable as a foam for the composite structural article of the present invention. It is possible to adopt therefor those obtained by making resin foams recovered from a shredder dust of an automobile into pieces of a predetermined size, for example, in addition to commercially available resin foams.

The melting point of the resin constituting the resin foam is preferably higher than the melting point of the low melting-point component constituting the thermally fusion-bondable composite fiber. A polyurethane foam is particularly preferable as the resin foam.

The resin foam preferably has a size passing through a sieve having an opening of 19 mm according to JIS Z8801. The more preferable is a size passing through a sieve having an opening of 19 mm and not passing through a sieve having an opening of 4.75 mm, and is further preferably a size passing through a sieve having an opening of 16 mm and not passing through a sieve having an opening of 4.75 mm. A small foam having a size passing through a sieve having an opening of 4.75 mm may be included, however, the content thereof is preferably 10% or less by weight, and more preferably in the range from 1% to 7% by weight, based on 100% by weight of the total foams.

The amount of the resin foam to be used is preferably in the range from 7% to 68% by weight, more preferably from 15% to 65% by weight, and further preferably from 20% to 60% by weight, based on 100% by weight of the total of a foam and the starting fiber including a thermally fusion-bondable composite fiber.

Figure 4:
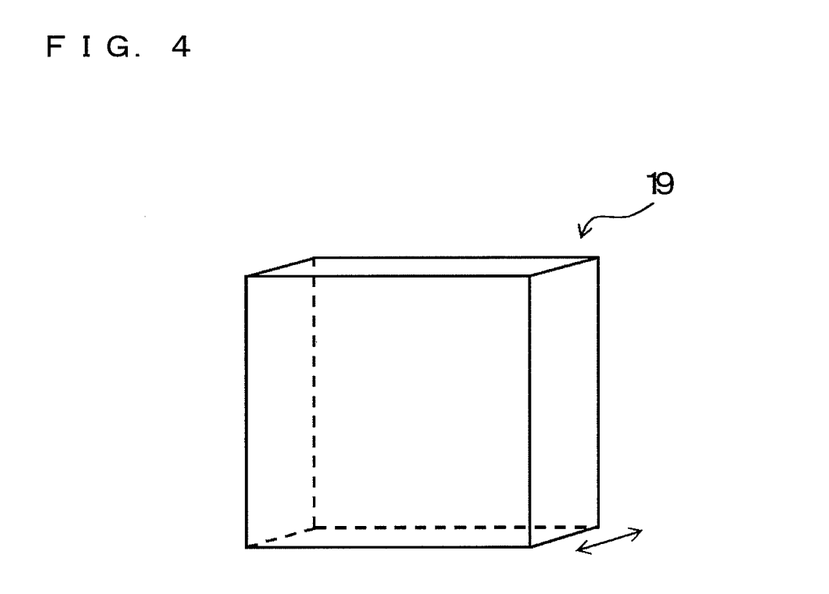
FIG. 4 is a schematic view of a rectangular vessel used in Examples and Comparative Examples.

In the case where starting fibers consisting of the ordinary fiber and the thermally fusion-bondable composite fiber, the starting fibers and the resin foams are firstly filled into a vessel 19 (which may have through-holes) shown in FIG. 4 such that the starting fibers are oriented in an arrow direction. At this time, it is possible to fill the starting fibers and the resin foams into the vessel, while pressurizing the fibers and foams. Thereafter, the filled matters are heated at a temperature, which is preferably at or higher than the melting point of the low melting-point component constituting the thermally fusion-bondable composite fiber and is lower than the melting point of the high melting-point resin, thereby enabling to integrate the ordinary fibers, the high melting-point resin portions of the thermally fusion-bondable composite fibers, and the resin foams with one another. The heating method is not particularly limited, in case of adopting the vessel 19 shown in FIG. 4. When the vessel is provided with through-holes, the through-holes may be provided at any one of an upper surface, lower surface, and side surface of the vessel. And it is then possible to conduct hot air heating by utilizing the through-holes. Upon heating the filled matters, and after the heating, pressurization may be conducted, as required.

When the thermally fusion-bondable composite fiber is used in the above manner, the molten low melting-point component functions as an adhesive agent and a composite structural article can be obtained shown in FIG. 1.

Other examples of the production method are as follows.
(X) A method in which an ordinary fiber not having a thermal fusion bondability, and a resin foam are filled into the vessel, for example, shown in FIG. 4 such that the starting fibers are oriented in the arrow direction, and thereafter an adhesive agent composition is filled into the vessel, to thereby adhere the resin foam and the fiber to one another while adhering the fibers themselves to one another, and form an integrated product.
(Y) A method in which an ordinary fiber not having a thermal fusion bondability is contacted with an adhesive agent composition; and thereafter the fiber and a resin foam are filled into the vessel, for example, shown in FIG. 4 such that the starting fibers are oriented in the arrow direction, to thereby adhere the resin foam and the fiber to one another while adhering the fibers themselves to one another, and form an integrated product.

In the methods (X) and (Y), it is possible to adopt an acryl-based adhesive agent, a urethane-based adhesive agent, a polyester-based adhesive agent, a vinyl acetate-based adhesive agent, a cyanoacrylate-based adhesive, an SBR-based adhesive, and the like, as the adhesive composition. The form thereof is not particularly limited, and may be in a form of emulsion, or the like.

Further, upon establishing the resin foams and fibers into a integrated product in each of the methods (X) and (Y), it is possible to pressurize the applicable mixture, as required.

In the present invention, when a composite structural article having a structure shown in FIG. 3 is produced, a forming mold is preferably used, which has a hollow space in a plate-like shape, has a starting material supplying port through a bottom wall of the forming mold near a center thereof, and has air-permeable through-holes at an upper surface, lower surface, or side surface. When starting fibers of the ordinary fiber and thermally fusion-bondable composite fiber, and foams are introduced into the forming mold through the starting material supplying port by utilizing an air stream, for example, the starting fibers and foams are filled into the hollow area of the forming mold such that the starting fibers and foams are sequentially and depositedly stacked from a space portion, which is farther from the starting material supplying port, toward the port. At this time, the starting fibers are filled into the forming mold in a configuration of concentric circles about the starting material supplying port acting as a central axis, because the starting material supplying port is located near the center of the forming mold. When the filling of the starting fibers and foams into the forming mold is completed, heating is conducted in the same way as the above, thereby enabling to manufacture a composite structural article shown in FIG. 3.

The composite structural article of the present invention is suitable for a member which is disposed in a floor of an automobile and in a building such as a house, and a member which is disposed in a ceiling and a wall in a building such as a house, and the like. Further, the composite structural article of the present invention is usable as an impact absorbing material, a sound absorbing material, a heat insulator, and the like.

EXAMPLE

Hereinafter, the invention will be more specifically described by way of Examples. In the following description, "part(s)" and "%" are based on weight unless otherwise indicated.
1. Starting Material
Starting materials for the production of a composite structural article are as follows.
1-1. Fiber
(1) Fiber (A1)
Used was a short fiber "SD150" (trade name) manufactured by Takayasu Co., Ltd. It is made of a polyethylene terephthalate and has an average fineness of 3.3 dtex and an average fiber length of 10 mm.

(2) Fiber (A2)

Used was a thermally fusion-bondable sheath-core type short fiber "T9611" (trade name) manufactured by Toray Industries Inc. The sheath portion thereof is made of a copolymerized polyester having a melting point of 110° C., and the core portion thereof is made of a polyethylene terephthalate having melting point of 230° C. The weight ratio of the sheath portion and core portion is 1:1. The fiber has an average fineness of 2.2 dtex and an average fiber length of 10 mm.

1-2. Foam

Used was a crushed matter obtained by crushing a massive soft polyurethane foam. The foam has a density of 0.015 to 0.030 g/cm$^3$.

2. Production and Evaluation of Composite Structural Article

Upon production of composite structural articles in Examples and Comparative Examples, the vessel shown in FIG. 4 was used.

FIG. 4 is a schematic view of a metal-made rectangular vessel (inner dimensions: 250 mm×250 mm×36 mm) having an openable and closable lid attached to an upper portion of the vessel. The vessel is formed with through-holes each having a diameter of 2 mm at regular intervals, through any one of surfaces of the vessel. Further, the space portion having the inner width of 36 mm is configured to have a front face or a rear face, which is movable, so that the space portion may be narrowed down to an inner width of 30 mm.

Example 1

40 parts of the fiber (A1) and 20 parts of the fiber (A2) were passed through an opener two times, to obtain a fiber mixture. Subsequently, the fiber mixture was mixed with 40 parts of foam, which was allowed to pass through a sieve having an opening of 5.6 mm and not passed through a sieve having an opening of 4.75 mm, according to JIS Z8801, thereby preparing a starting mixture (totally 5 grams).

Thereafter, the starting mixture was filled into the rectangular vessel shown in FIG. 4 through the upper opening portion thereof while pressurizing the mixture, such that the fibers were oriented in the arrow direction in FIG. 4.

Then, the rectangular vessel filled with the starting mixture was introduced into a hot air drier, and heated at a temperature of 180° C. for 60 seconds, in a manner to flow a hot air through the through-holes of the vessel. Thereafter, the thickness was brought down from 36 mm to 30 mm by pressurization, while utilizing a residual heat. The thus compressedly formed product was subjected to cooling, to obtain a composite structural article in a plate-like shape (see FIGS. 1 and 2).

The resultant composite structural article was subjected to evaluation according to JIS L1021-6 (2007). The evaluating method is described below.

A static loading tester was used to apply a pressure of 220 kPa onto a surface of the composite structural article, for 2 hours. A thickness (t2) of the composite structural article just after releasement of the pressure application, a thickness (t3) of the composite structural article after a lapse of 1 hour from the releasement of the pressure application were measured. Then, a thickness (t1) of the composite structural article just after the production was used with these thicknesses to calculate: (i) a thickness reduction value (t1−t2); (ii) a thickness reduction value (t1−t3); (iii) a depression ratio [(t2/t1)×100] (unit: %) of the composite structural article at the pressurized portion just after releasement of the load application; and (iv) a depression ratio [(t3/t1)×100] (unit: %) of the composite structural article at the pressurized portion after a lapse of 1 hour from the releasement of the load application. Smaller thickness reduction values (t1−t2) and (t1−t3) imply smoother restoration from the depressed state.

Example 2

Production and evaluation of the composite structural article were conducted in the same manner as Example 1, except for adoption of a foam which was passed through a sieve having an opening of 11.2 mm and was not passed through a sieve having an opening of 9.5 mm. Evaluation results are shown in Table 1.

Example 3

Production and evaluation of the composite structural article were conducted in the same manner as Example 1, except for adoption of a foam which was passed through a sieve having an opening of 16 mm and was not passed through a sieve having an opening of 13.2 mm. Evaluation results are shown in Table 1.

Example 4

Production and evaluation of the composite structural article were conducted in the same manner as Example 1, except for adoption of 40 parts of fiber (A1), 20 parts of fiber (A2), and 40 parts of a foam which was passed through a sieve having an opening of 22.9 mm and was not passed through a sieve having an opening of 19 mm; the total amount of the starting mixture was 5 grams. Evaluation results are shown in Table 1.

Example 5

Production and evaluation of the composite structural article were conducted in the same manner as Example 1, except for adoption of 20 parts of fiber (A1), 20 parts of fiber (A2), and 60 parts of a foam which was passed through a sieve having an opening of 11.2 mm and was not passed through a sieve having an opening of 9.5 mm; the total amount of the starting mixture was 5 grams. Evaluation results are shown in Table 1.

Example 6

Production and evaluation of the composite structural article were conducted in the same manner as Example 1, except for adoption of 60 parts of fiber (A1), 20 parts of fiber (A2), and 20 parts of a foam which was passed through a sieve having an opening of 11.2 mm and was not passed through a sieve having an opening of 9.5 mm; the total amount of the starting mixture was 5 grams. Evaluation results are shown in Table 1.

Example 7

Production and evaluation of the composite structural article were conducted in the same manner as Example 1, except for adoption of 70 parts of fiber (A1), 20 parts of fiber (A2), and 10 parts of a foam which was passed through a sieve having an opening of 11.2 mm and was not passed through a sieve having an opening of 9.5 mm; the total amount of the starting mixture was 5 grams. Evaluation results are shown in Table 1.

Example 8

Production and evaluation of the composite structural article were conducted in the same manner as Example 1, except for adoption of 72.5 parts of fiber (A1), 20 parts of fiber (A2), and 7.5 parts of a foam which was passed through a sieve having an opening of 11.2 mm and was not passed through a sieve having an opening of 9.5 mm; the total amount of the starting mixture was 5 grams. Evaluation results are shown in Table 1.

Example 9

Production and evaluation of the composite structural article were conducted in the same manner as Example 1, except for adoption of 15 parts of the fiber (A1), 20 parts of the fiber (A2), and 65 parts of a foam which was passed through a sieve having an opening of 11.2 mm and was not passed through a sieve having an opening of 9.5 mm; the total amount of the starting mixture was 5 grams. Evaluation results are shown in Table 1.

Comparative Example 1

Production and evaluation of the composite structural article were conducted in the same manner as Example 1, except for adoption of 80 parts and 20 parts of the fiber (A1) and fiber (A2), respectively, without adopting any foams; the total amount of the starting mixture was 5 grams. Evaluation results are shown in Table 2.

Comparative Example 2

Production and evaluation of the composite structural article were conducted in the same manner as Example 1, except for adoption of 20 parts of the fiber (A2) and 80 parts of a foam which was passed through a sieve having an opening of 11.2 mm and was not passed through a sieve having an opening of 9.5 mm, without adopting the fiber (A1); the total amount of the starting mixture was 5 grams. Evaluation results are shown in Table 2.

Comparative Example 3

Production and evaluation of the composite structural article were conducted in the same manner as Example 1, except for adoption of 10 parts of the fiber (A1), 20 parts of the fiber (A2), and 70 parts of a foam which was passed through a sieve having an opening of 11.2 mm and was not passed through a sieve having an opening of 9.5 mm; the total amount of the starting mixture was 5 grams. Evaluation results are shown in Table 2.

Comparative Example 4

Production and evaluation of the composite structural article were conducted in the same manner as Example 1, except for adoption of 75 parts of the fiber (A1), 20 parts of the fiber (A2), and 5 parts of a foam which was passed through a sieve having an opening of 11.2 mm and was not passed through a sieve having an opening of 9.5 mm; the total amount of the starting mixture was 5 grams. Evaluation results are shown in Table 2.

Comparative Example 5

40 parts of the fiber (A1) and 20 parts of the fiber (A2) were passed through an opener two times, to obtain a fiber mixture. Subsequently, the fiber mixture was mixed with 40 parts of foam, which was allowed to pass through a sieve having an opening of 11.2 mm and not passed through a sieve having an opening of 9.5 mm, thereby preparing a starting mixture (totally 5 grams).

Thereafter, the starting mixture was filled into the rectangular vessel shown in FIG. 4 through the upper opening portion thereof while pressurizing the mixture, such that the fibers were oriented in the arrow direction in FIG. 4.

Figure 5:
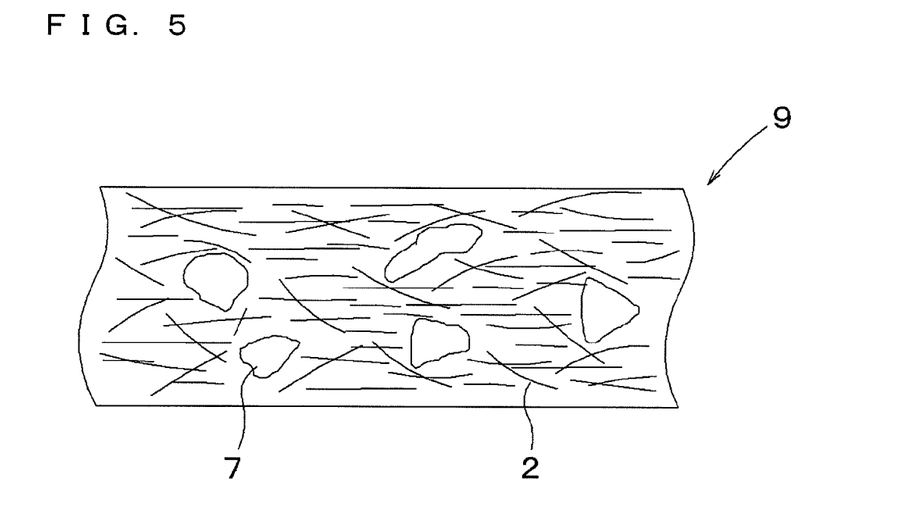

Then, the rectangular vessel filled with the starting mixture was introduced into a hot air drier, and heated at a temperature of 180° C. for 60 seconds, in a manner to flow a hot air through the through-holes of the vessel. Thereafter, the thickness was brought down from 36 mm to 30 mm by pressurization, while utilizing a residual heat. The thus compressedly formed product was subjected to cooling, to obtain a composite structural article in a plate-like shape (see FIG. 5). The resultant composite structural article was subjected to evaluation in the same manner as Example 1. Evaluation results are shown in Table 2.

Comparative Example 6

Production and evaluation of the composite structural article were conducted in the same manner as Comparative Example 5, except for adoption of 60 parts of the fiber (A1), 20 parts of the fiber (A2), and 20 parts of a foam which was passed through a sieve having an opening of 11.2 mm and was not passed through a sieve having an opening of 9.5 mm; the total amount of the starting mixture was 5 grams. Evaluation results are shown in Table 2.

Comparative Example 7

Production and evaluation of the composite structural article were conducted in the same manner as Example 5, except for adoption of 80 parts and 20 parts of the fiber (A1) and fiber (A2), respectively, without adopting any foams; the total amount of the starting mixture was 5 grams. Evaluation results are shown in Table 2.

Comparative Example 8

Production and evaluation of the composite structural article were conducted in the same manner as Comparative Example 5, except for adoption of 20 parts of the fiber (A1), 20 parts of the fiber (A2), and 60 parts of a foam which was passed through a sieve having an opening of 11.2 mm and was not passed through a sieve having an opening of 9.5 mm; the total amount of the starting mixture was 5 grams. Evaluation results are shown in Table 2.

Comparative Example 9

Production and evaluation of the composite structural article were conducted in the same manner as Example 5, except for adoption of 20 parts of the fiber (A2) and 80 parts of a foam which was passed through a sieve having an opening of 11.2 mm and was not passed through a sieve having an opening of 9.5 mm, without adopting the fiber (A1); the total amount of the starting mixture was 5 grams. Evaluation results are shown in Table 2.

TABLE 1

| | | Orientation of fiber | Content of foam (% by weight) | Thickenss (t1) of composite structural article just after production (mm) | Thickenss (t2) of composite structural article just after releasement of load application (mm) | Thickenss (t3) of composite structural article after lapser of 1 hour from releasement of load application (mm) | t1 − t2 (mm) | t1 − t3 (mm) | Depression ratio [(t2/t1) × 100] (%) | Depression ratio [(t3/t1) × 100](%) |
|---|---|---|---|---|---|---|---|---|---|---|
| Example | 1 | Vertical | 40 | 29.63 | 15.43 | 26.18 | 14.20 | 3.45 | 52.08 | 88.36 |
| | 2 | Vertical | 40 | 29.97 | 17.31 | 26.95 | 12.66 | 3.02 | 57.76 | 89.92 |
| | 3 | Vertical | 40 | 30.27 | 17.12 | 27.26 | 13.15 | 3.01 | 56.56 | 90.06 |
| | 4 | Vertical | 40 | 30.73 | 17.17 | 26.94 | 13.56 | 3.79 | 55.87 | 87.67 |
| | 5 | Vertical | 60 | 30.00 | 19.65 | 27.25 | 10.35 | 2.75 | 65.50 | 90.83 |
| | 6 | Vertical | 20 | 29.88 | 19.15 | 27.45 | 10.73 | 2.43 | 64.09 | 91.87 |
| | 7 | Vertical | 10 | 30.11 | 15.58 | 27.34 | 14.53 | 2.77 | 51.74 | 90.80 |
| | 8 | Vertical | 7.5 | 30.25 | 16.80 | 26.74 | 13.45 | 3.51 | 55.54 | 88.40 |
| | 9 | Vertical | 65 | 30.98 | 19.43 | 27.35 | 11.55 | 3.63 | 62.72 | 88.28 |

TABLE 2

| | | Orientation of fiber | Content of foam (% by weight) | Thickenss (t1) of composite structural article just after production (mm) | Thickenss (t2) of composite structural article just after releasement of load application (mm) | Thickenss (t3) of composite structural article after lapser of 1 hour from releasement of load application (mm) | t1 − t2 (mm) | t1 − t3 (mm) | Depression ratio [(t2/t1) × 100] (%) | Depression ratio [(t3/t1) × 100] (%) |
|---|---|---|---|---|---|---|---|---|---|---|
| Comparative Example | 1 | Vertical | 0 | 29.93 | 15.62 | 25.68 | 14.31 | 4.25 | 52.19 | 85.80 |
| | 2 | Vertical | 80 | 30.93 | 13.53 | 25.21 | 17.40 | 5.72 | 43.74 | 81.51 |
| | 3 | Vertical | 70 | 30.98 | 20.40 | 26.95 | 10.58 | 4.03 | 65.85 | 86.99 |
| | 4 | Vertical | 5 | 30.45 | 15.60 | 26.23 | 14.85 | 4.22 | 51.23 | 86.14 |
| | 5 | Lateral | 40 | 29.73 | 14.62 | 27.40 | 15.11 | 2.24 | 49.18 | 92.16 |
| | 6 | Lateral | 20 | 29.85 | 14.24 | 26.55 | 15.61 | 3.30 | 47.71 | 88.94 |
| | 7 | Lateral | 0 | 28.84 | 13.08 | 25.34 | 15.76 | 3.50 | 45.35 | 87.86 |
| | 8 | Lateral | 60 | 30.72 | 13.61 | 26.50 | 17.11 | 4.22 | 44.30 | 86.26 |
| | 9 | Lateral | 80 | 30.88 | 13.17 | 27.05 | 17.71 | 3.83 | 42.65 | 87.60 |

As apparent from Table 2, Comparative Examples 1 to 4 were examples of composite structural articles where orientations of fibers were in vertical directions. Thickness reduction values (t1−t3) exceeded 4.00 mm, and depressed portions were insufficient in restoration even after a lapse of 2 hours from releasement of the load application. In addition, Comparative Examples 5 to 9 were examples of composite structural articles where orientations of fibers were in lateral directions. Thickness reduction values (t1−t2) exceeded 15.00 mm, depression ratios (t2/t1) were less than 50%, and depressed portions were insufficient in restoration just after releasement of the load application.

On the other hand, as apparent from Table 1, the composite structural articles of Examples 1 to 9 had thickness reduction values (t1−t3) less than 3.80 mm, and thickness reduction values (t1−t2) less than 14.60 mm, respectively, thereby each exhibiting excellent restoring property from depression. It is understood that Examples 2, 3, 5, and 6 were particularly excellent, since both the thickness reduction values (t1−t2) and (t1−t3) were small in each case, and each depression ratio (t3/t1) was so high to be 87.00% or more.

Figure 6:
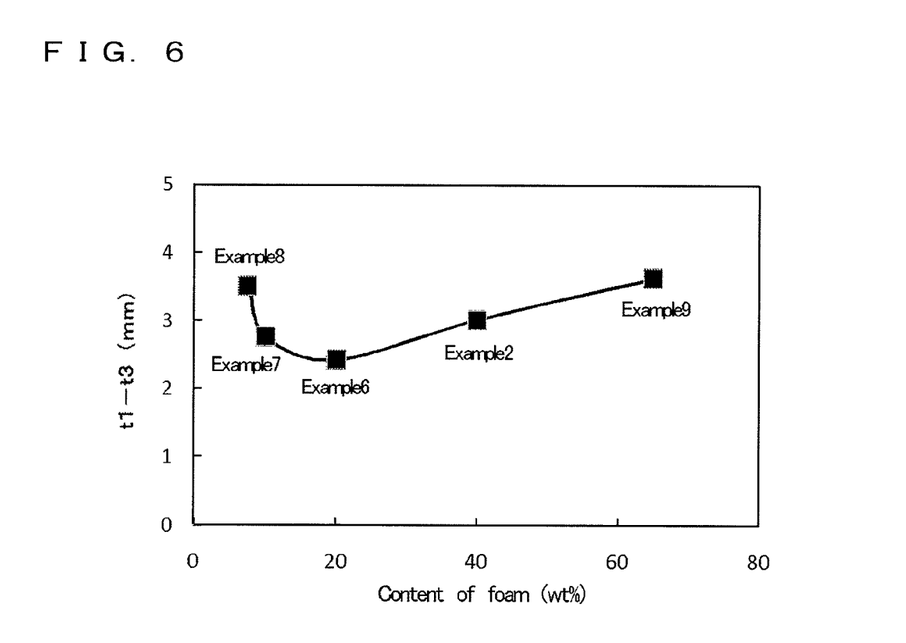
FIG. 6 is a graph showing a relationship between a content of a foam and a thickness reduction value (t1−t3) obtained by adopting results in Examples.

Upon comparison of Examples 2 and 6 to 9, which were each made into a thickness of about 30 mm by using starting materials each containing a foam which was allowed to pass through a sieve having an opening of 11.2 mm and not passed through a sieve having an opening of 9.5 mm while changing the content the foam one another, it is understood from FIG. 6 that the thickness reduction value (t1−t3) is excellently made to be smaller when the content of the foam is made to be about 20% by weight.

Figure 7:
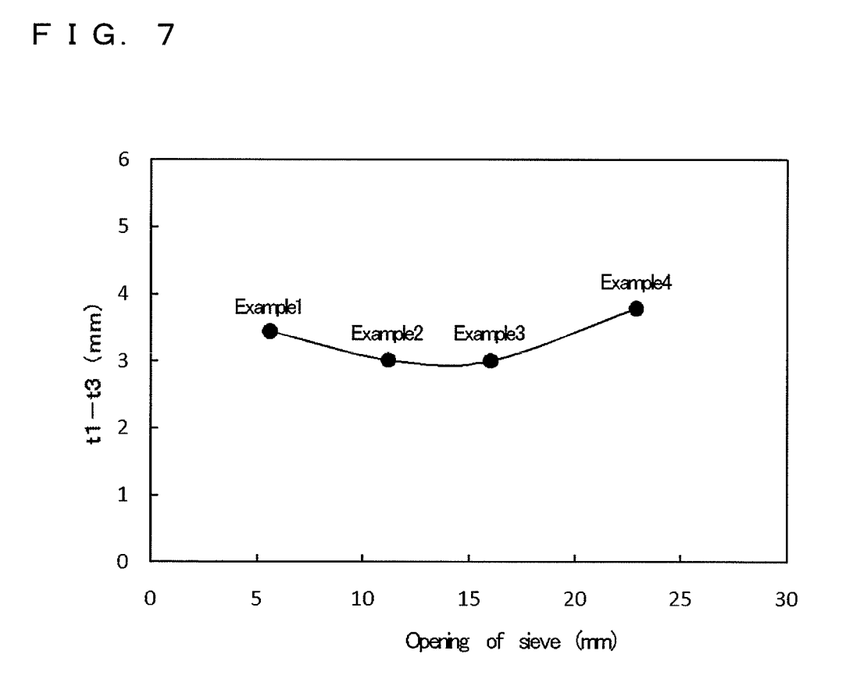
FIG. 7 is a graph showing a relationship between a size of a foam and a thickness reduction value (t1−t3) obtained by adopting results in Examples.

In addition, upon comparison of Examples 1 to 4, which were each made into a thickness of about 30 mm by using starting materials in which amounts of the fibers and foams to be used was same ratio except changing the size of the foam, it is understood from FIG. 7 that those foams adopted in Examples 2 and 3 were preferable, which were in such sizes allowed to pass through a sieve having an opening of 16 mm and not passed through a sieve having an opening of 9.5 mm.

It is also understood that Examples 5 and 6, where the content of the foam in a size allowed to pass through a sieve having an opening of 11.2 mm and not passed through a sieve having an opening of 9.5 mm were 60% and 20%, respectively, were excellent because both the thickness reduction values (t1−t2) and (t1−t3) were small in each Example.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

What is claimed is:

1. A composite structural article in a plate-like shape comprising:
   a plurality of mutually adhered fibers;
   an adhering layer comprising an adhesive agent and configured to adhere the mutually adhered fibers together via the adhesive agent; and
   a foam which is arranged in a gap among said fibers and is adhered to said fibers via the adhesive agent,
   wherein said fibers are generally oriented from a first surface side toward a second surface side of said composite structural article,
   wherein said fibers have an average length from 5 to 25 mm,
   wherein a content of said foam in said composite structural article is in a range from 20% to 60% by weight based on 100% by weight of a total weight of said fibers, said foam and said adhesive agent of said composite structural article,
   wherein said foam comprises large foam pieces having a size passable through a sieve having an opening of 16 mm and not passable through a sieve having an opening of 9.5 mm according to JIS Z8801, and
   wherein said foam comprises small foam pieces having a size passable through a sieve having an opening of 4.75 mm, and a content of said small foam pieces is 10% or less by weight based on 100% by weight of a total weight of the foam.

2. The composite structural article according to claim 1, wherein a thickness of said composite structural article is in a range from 30 to 100 mm.

3. The composite structural article according to claim 1, wherein when a load application of 220 kPa is applied to a surface of said composite structural article according to JIS L1021, a depression ratio $[(t2/t1) \times 100]$ of said composite structural article just after releasement of the load application, and a depression ratio $[(t3/t1 \times 100]$ of said composite structural article after a lapse of 1 hour from the releasement of the load application, satisfy the following equations (1) and (2):

$$(t2/t1) \times 100 > 50.00 \quad (1)$$

$$(t3/t1) \times 100 > 87.00 \quad (2)$$

wherein t1 is a thickness of said composite structural article before the load application; t2 is a thickness of said composite structural article just after releasement of the load application; and t3 is a thickness of said composite structural article after a lapse of 1 hour from the releasement of the load application.

4. The composite structural article according to claim 1, wherein said fibers comprise a fiber of polyethylene terephtharate.

* * * * *